(12) United States Patent
Furukawa et al.

(10) Patent No.: US 11,420,728 B2
(45) Date of Patent: Aug. 23, 2022

(54) AIRCRAFT AND CONTROL METHOD FOR SAME

(71) Applicant: HONDA MOTOR CO., LTD., Tokyo (JP)

(72) Inventors: Jun Furukawa, Wako (JP); Masashi Kato, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 65 days.

(21) Appl. No.: 17/251,831

(22) PCT Filed: Jun. 18, 2019

(86) PCT No.: PCT/JP2019/024118
§ 371 (c)(1),
(2) Date: Dec. 14, 2020

(87) PCT Pub. No.: WO2019/244893
PCT Pub. Date: Dec. 26, 2019

(65) Prior Publication Data
US 2021/0253221 A1    Aug. 19, 2021

(30) Foreign Application Priority Data

Jun. 19, 2018 (JP) .............................. JP2018-115886

(51) Int. Cl.
*B64C 13/00* (2006.01)
*B64C 13/04* (2006.01)
(Continued)

(52) U.S. Cl.
CPC ....... *B64C 13/0423* (2018.01); *G05D 1/0808* (2013.01); *G05D 1/0858* (2013.01); *G05D 1/102* (2013.01); *B64C 29/0016* (2013.01)

(58) Field of Classification Search
CPC . B64C 13/0423; B64C 29/0016; B64C 11/48; B64C 29/0025; B64C 39/026;
(Continued)

(56) References Cited

U.S. PATENT DOCUMENTS 9,896,202 B2 * 2/2018 Jourdan ................. G08G 5/045
2012/0232718 A1   9/2012 Rischmuller et al.
(Continued)

FOREIGN PATENT DOCUMENTS

JP    2007-062451    3/2007
JP    2011-131861    7/2011
(Continued)

OTHER PUBLICATIONS

International Search Report and Written Opinion for International Application No. PCT/JP2019/024118 dated Aug. 20, 2019, 11 pages.
(Continued)

*Primary Examiner* — Ian Jen
(74) *Attorney, Agent, or Firm* — Amin, Turocy & Watson, LLP

(57) ABSTRACT

An aircraft and a control method therefor. The aircraft has: a velocity acquisition unit that acquires the velocity of the aircraft; a roll angle calculation unit that calculates the roll angle of the aircraft; a turning radius calculation unit that calculates the turning radius of the aircraft on the basis of the velocity and the roll angle; and a yaw rate calculation unit that calculates the yaw rate of the aircraft on the basis of the velocity and the turning radius. A control unit controls flight of the aircraft on the basis of the roll angle and the yaw rate.

10 Claims, 7 Drawing Sheets

(51) Int. Cl.
*G05D 1/08* (2006.01)
*G05D 1/10* (2006.01)
*B64C 29/00* (2006.01)

(58) Field of Classification Search
CPC .... G05D 1/0808; G05D 1/0858; G05D 1/102; Y02T 50/60; B64D 27/24; B64D 31/04
See application file for complete search history.

(56) References Cited

U.S. PATENT DOCUMENTS

| | | |
|---|---|---|
| 2017/0096040 A1 | 4/2017 | Kurita |
| 2018/0112980 A1* | 4/2018 | Diem .................... G01C 17/38 |
| 2019/0161188 A1 | 5/2019 | Zapata |

FOREIGN PATENT DOCUMENTS

| | | |
|---|---|---|
| JP | 2015-205646 | 11/2015 |
| JP | 5997338 | 9/2016 |
| JP | 6012205 | 10/2016 |
| JP | 6114862 | 4/2017 |
| WO | 2017/174944 | 10/2017 |

OTHER PUBLICATIONS

Hoversurf, Hoverbike Hover One, https://www.hoversurf.com/orderyours; https://www.designboom.com/technology/hoversurf-scorpion-3-hoverbike-Feb. 20, 2017/.

* cited by examiner

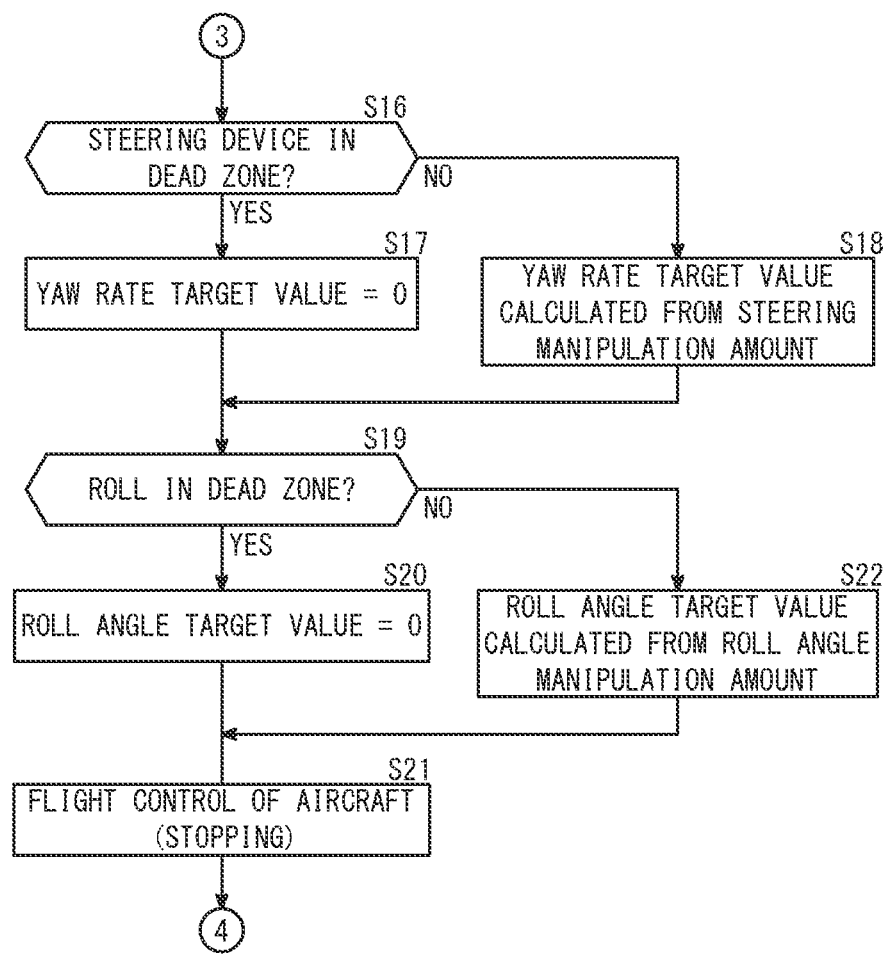

AIRCRAFT AND CONTROL METHOD FOR SAME

TECHNICAL FIELD

The present invention relates to an aircraft capable of flying through the air based on manipulation of a manipulating section by a rider, and to a control method for the aircraft.

BACKGROUND ART

Japanese Laid-Open Patent Publication No. 2011-131861 discloses causing a vertical takeoff and landing machine to fly in a desired direction, by relatively moving weight while the rider manipulates a handlebar to the front, rear, left, and right. For example, the machine can be made to advance by drawing the handlebar toward the rider, and can be made to turn left by pressing the handlebar forward and to the right.

Furthermore, the Internet site of Hoversurf, Hoverbike HOVER ONE, [Searched May 17, 2018], <URL: www.hoversurf.com/scorpion-3>discloses adjusting the roll angle, pitch angle, yaw rate, altitude, and the like of an aircraft by having a rider manipulate joysticks provided to the left and right of the position of the rider.

In addition, Japanese Patent No. 6012205, Japanese Patent No. 6114862, and Japanese Patent No. 5997338 disclose remote-controlled multicopters.

SUMMARY OF INVENTION

For an aircraft that is ridden by a rider, it is desirable for the rider to be able to manipulate the aircraft with the same sense as another moving body such as a motorcycle or four-wheel vehicle.

However, with the aircraft in these documents, it is impossible to make a turn or the like unless both a roll angle and a yaw rate are designated. Furthermore, since the aircraft of Japanese Patent No. 6012205, Japanese Patent No. 6114862, and Japanese Patent No. 5997338 are remote-controlled, it is difficult to use these aircraft in a manner to accommodate a rider.

The present invention has been devised in order to solve this type of problem, and has the object of providing an aircraft that can be made to fly using manipulations similar to those of another moving body, and to a control method of this aircraft.

An aspect of the present invention concerns an aircraft including a manipulating section that is manipulated by a rider and a control section that controls flight in air based on manipulation of the manipulating section by the rider, and a control method of this aircraft.

The aircraft further includes a velocity acquiring section configured to acquire a velocity of the aircraft; a roll angle calculating section configured to calculate a roll angle of the aircraft, based on at least a center of mass movement amount of the aircraft or a manipulation amount of the manipulating section; a turn radius calculating section configured to calculate a turn radius of the aircraft, based on the velocity and the roll angle; and a yaw rate calculating section configured to calculate a yaw rate of the aircraft, based on the velocity and the turn radius.

In this case, the control section is configured to control the flight of the aircraft based on the roll angle and the yaw rate.

According to the present invention, the rider manipulates only at least the manipulating section. Accordingly, the roll angle and the yaw rate are set automatically on the aircraft side based on the manipulation amount str of the steering handlebar or the steering wheel, and the aircraft flies based on the set roll angle and yaw rate. Therefore, it is possible to fly the aircraft with the same type of manipulation as used for other moving bodies, using a simple configuration.

BRIEF DESCRIPTION OF DRAWINGS

FIG. 7 is a flow chart of another operation of the aircraft of FIGS. 1 and 2.

DESCRIPTION OF EMBODIMENTS

The following describes preferred embodiments of an aircraft and a control method thereof according to the present invention, while referencing the accompanying drawings.

[1. Configuration of the Present Embodiment]

Figure 1:
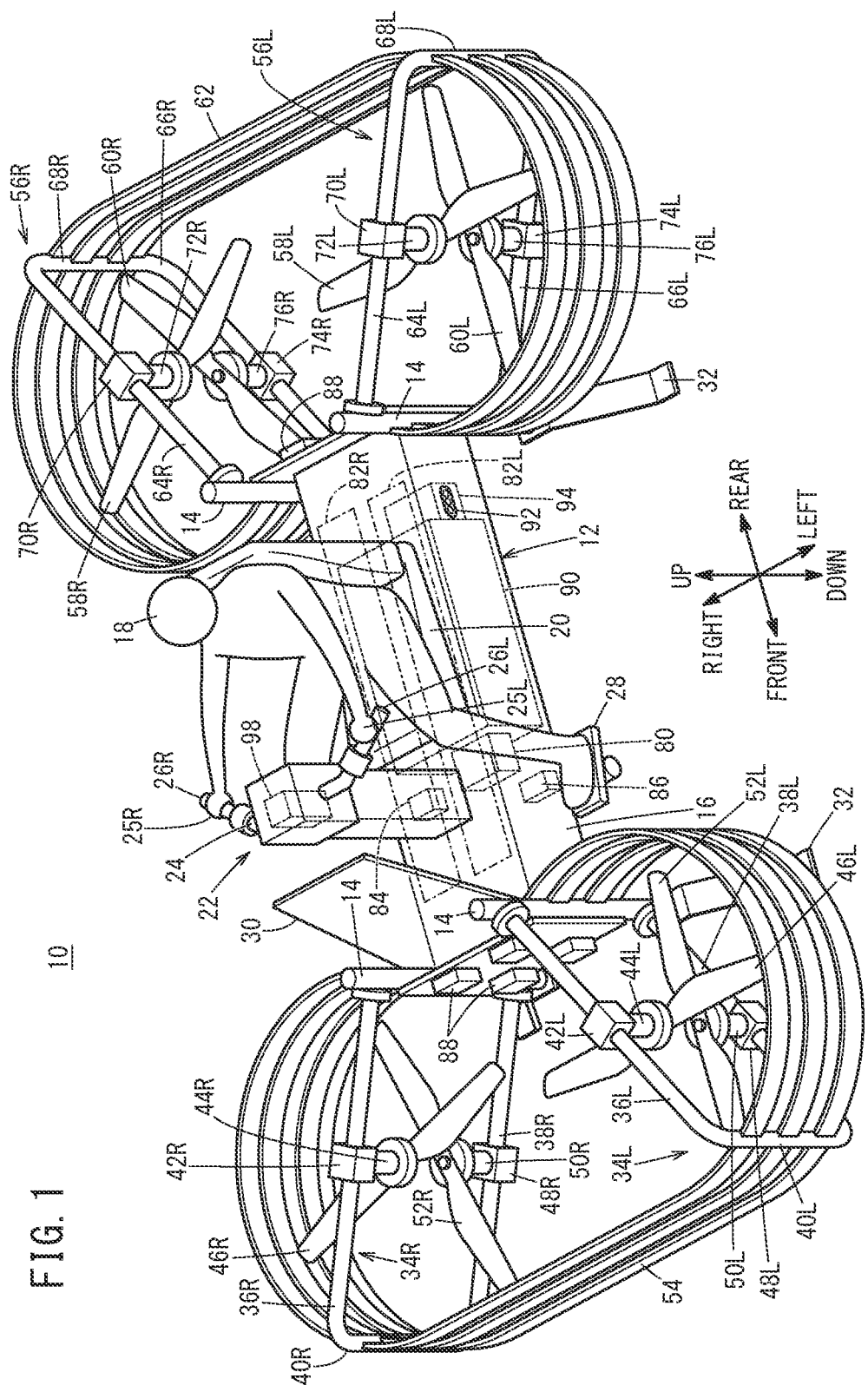
FIG. 1 is a perspective view of an aircraft according to the present embodiment.

As shown in FIG. 1, an aircraft 10 according to the present embodiment is a multicopter including a body frame 12 with a rectangular shape that is long in the front-rear direction. The body frame 12 is formed to include a skeletal body 14, which is a plurality of rod-shaped members such as pipe members combined into a parallelepiped, and eight exterior panels 16 attached to the skeletal body 14 in a manner to close each plane of the skeletal body 14. A portion of the skeletal body 14 is exposed to the outside from the external panels 16.

A rider seat 20 in which a rider 18 sits is provided on a top portion of the body frame 12. The following description is provided using the front, rear, left, right, up, and down directions as seen from the rider 18 sitting in the seat 20. Furthermore, in the following description, for configurational elements that are arranged in left-right sets, there are cases where the letters "L" and "R" are appended to the reference numerals to indicate left and right configurational elements.

A steering apparatus 22 is provided in front of the seat 20. The steering apparatus 22 includes a steering handlebar (manipulating section, steering device) 24 that can be steered by the rider 18, and handlebar grips 26L and 26R, which are gripped by left and right hands 25L and 25R of the rider 18, are provided at the left and right end portions of the steering handlebar 24.

Steps 28, where the feet of the rider 18 seated on the seat 20 are placed, are provided on the left and right sides of the body frame 12. A windshield hood 30, made of a transparent acrylic board or the like, is mounted in front of the steering apparatus 22 of the body frame 12. Leg-shaped landing gears 32 are attached at four locations at the front, rear, left, and right of the body frame 12.

A left-right pair of front support arms 34L and 34R are attached to the front portion of the skeletal body 14, by rod-shaped members such as pipe members. The left-side front support arm 34L is an arm member extending forward and to the left from the skeletal body 14, and includes an upper arm 36L that extends forward and to the left from the top left corner of the skeletal body 14, a lower arm 38L that extends forward and to the left, parallel to the upper arm 36L, from the bottom left corner of the skeletal body 14, and a connection rod 40L that connects a tip portion of the upper arm 36L and a tip portion of the lower arm 38L.

The right-side front support arm 34R is an arm member extending forward to the right from the skeletal body 14, and includes an upper arm 36R that extends forward and to the right from the top right corner of the skeletal body 14, a lower arm 38R that extends forward and to the right, parallel to the upper arm 36R, from the bottom right corner of the skeletal body 14, and a connection rod 40R that connects a tip portion of the upper arm 36R and a tip portion of the lower arm 38R.

Electric motors 44L and 44R are attached facing downward to an intermediate portion between the left and right upper arms 36L and 36R, via mounting members 42L and 42R. Double-bladed rotor wings 46L and 46R, which rotate centered on output shafts of respective electric motors 44L and 44R that extend downward, are attached horizontally to these output shafts.

On the other hand, electric motors 50L and 50R are attached facing upward to an intermediate portion between the left and right lower arms 38L and 38R, via mounting members 48L and 48R. In this case, double-bladed rotor wings 52L and 52R, which rotate centered on output shafts of the respective electric motors 50L and 50R that extend upward, are attached horizontally to these output shafts.

A guard member 54 is attached to the front portion of the body frame 12. Both ends of the guard member 54 are fixed to the body frame 12, and the guard member 54 is a board-shaped member with an oval shape extending in the left-right direction in a manner to surround the four rotor wings 46L, 46R, 52L, and 52R. In this case, the connection rods 40L and 40R are connected to the left and right sides of the front portion of the guard member 54.

A left-right pair of rear support arms 56L and 56R, four rotor wings 58L, 58R, 60L, and 60R, and a rear guard member 62 are provided at a rear portion of the skeletal body 14. The left-right pair of rear support arms 56L and 56R, the four rotor wings 58L, 58R, 60L, and 60R, and the rear guard member 62 respectively have the same configurations as the left-right pair of front support arms 34L and 34R, the four forward rotor wings 46L, 46R, 52L, and 52R, and the guard member 54.

In other words, the left-side rear support arm 56L is an arm member realized by a rod-shaped member such as a pipe member extending backward and to the left from the skeletal body 14, and includes an upper arm 64L that extends backward and to the left from the top left corner of the skeletal body 14, a lower arm 66L that extends backward and to the left, parallel to the upper arm 64L, from the bottom left corner of the skeletal body 14, and a connection rod 68L that connects a tip portion of the upper arm 64L and a tip portion of the lower arm 66L.

The right-side rear support arm 56R is an arm member realized by a rod-shaped member such as a pipe member extending backward and to the right from the skeletal body 14, and includes an upper arm 64R that extends backward and to the right from the top right corner of the skeletal body 14, a lower arm 66R that extends backward and to the right, parallel to the upper arm 64R, from the bottom right corner of the skeletal body 14, and a connection rod 68R that connects a tip portion of the upper arm 64R and a tip portion of the lower arm 66R.

Electric motors 72L and 72R are attached facing downward to an intermediate portion between the left and right upper arms 64L and 64R, via mounting members 70L and 70R. Double-bladed rotor wings 58L and 58R, which rotate centered on output shafts of the respective electric motors 72L and 72R that extend downward, are attached horizontally to these output shafts. Electric motors 76L and 76R are attached facing upward to an intermediate portion between the left and right lower arms 66L and 66R, via mounting members 74L and 74R. Double-bladed rotor wings 60L and 60R, which rotate centered on output shafts of the respective electric motors 76L and 76R that extend upward, are attached horizontally to these output shafts.

The rear guard member 62 is attached to the rear portion of the body frame 12. Both ends of the rear guard member 62 are fixed to the body frame 12, and the rear guard member 62 is a board-shaped member with an oval shape extending in the left-right direction in a manner to surround the four rotor wings 58L, 58R, 60L, and 60R. In this case, the connection rods 68L and 68R are connected to the left and right sides of the rear portion of the rear guard member 62.

The front and rear electric motors 44L, 44R, 50L, 50R, 72L, 72R, 76L, and 76R each independently rotationally drive a corresponding one of the rotor wings 46L, 46R, 52L, 52R, 58L, 58R, 60L, and 60R connected to the output shaft thereof. Specifically, in each set of two rotor wings 46L, 46R, 52L, 52R, 58L, 58R, 60L, and 60R arranged facing each other in the up-down direction, the rotor wings are rotationally driven in opposite directions from each other. The left-side rotor wings 46L, 52L, 58L, and 60L and the right-side rotor wings 46R, 52R, 58R, and 60R are arranged with left-right symmetry relative to a center line extending in the front-rear direction of the body frame 12. In other words, the aircraft 10 includes pairs of left-right and counter-rotating rotor wings 46L, 46R, 52L, 52R, 58L, 58R, 60L, and 60R arranged with left-right symmetry.

A flight controller 80, load cells 82L and 82R, an inertial measurement unit (IMU) 84, a downward distance sensor 86, a plurality of ESCs (Electronic Speed Controllers) 88 that individually control each of the electric motors 44L, 44R, 50L, 50R, 72L, 72R, 76L, and 76R, a battery 90, and a battery charger 94 with a connection plug 92 are attached to the body frame 12. The flight controller 80 controls each section of the aircraft 10 described below, by reading and executing a program stored in a memory (not shown in the drawings).

In the present embodiment, when the rider 18 manipulates the steering handlebar 24 or the handlebar grip 26R, the flight controller 80 controls the flight of the aircraft 10 by controlling each of the electric motors 44L, 44R, 50L, 50R, 72L, 72R, 76L, and 76R according to the manipulation amount of the steering handlebar 24 or the handlebar grip 26R.

Specifically, in a state where the rider 18 is gripping the handlebar grips 26L and 26R with their left and right hands 25L and 25R, when the steering handlebar 24 is steered around an axis in the up-down direction (yaw direction), it is possible to turn the aircraft 10 in a steering direction. In other words, it is possible to control the aircraft 10 in the yaw direction by having the rider 18 manipulate the steering handlebar 24. As an example, when the rider 18 rotates the handlebar grip 26R with their hand 25R, the aircraft 10 can be made to fly forward (advancing direction) or backward (reversing direction).

Essentially, with the aircraft 10 according to the present embodiment, in order to improve the affinity between the rider 18 and the aircraft 10, the steering apparatus 22 is configured to use manipulations similar to those of the steering handlebar and throttle grip of a motorcycle, except when reversing.

A manipulation amount detection sensor 98, which is formed by a torque sensor or rotational angle sensor, is housed in the steering apparatus 22. The manipulation amount detection sensor 98 detects the steering angle of the steering handlebar 24 relative to a neutral position, when the rider 18 has steered the steering handlebar 24 around an axis in the up-down direction. Furthermore, the manipulation amount detection sensor 98 detects a rotational angle of the handlebar grip 26R relative to the neutral position, as the manipulation amount (position) of the handlebar grip 26R caused by the rider 18. Accordingly, the flight controller 80 can control the flight of the aircraft 10 based on the steering angle or manipulation amount detected by the manipulation amount detection sensor 98.

Figure 2:
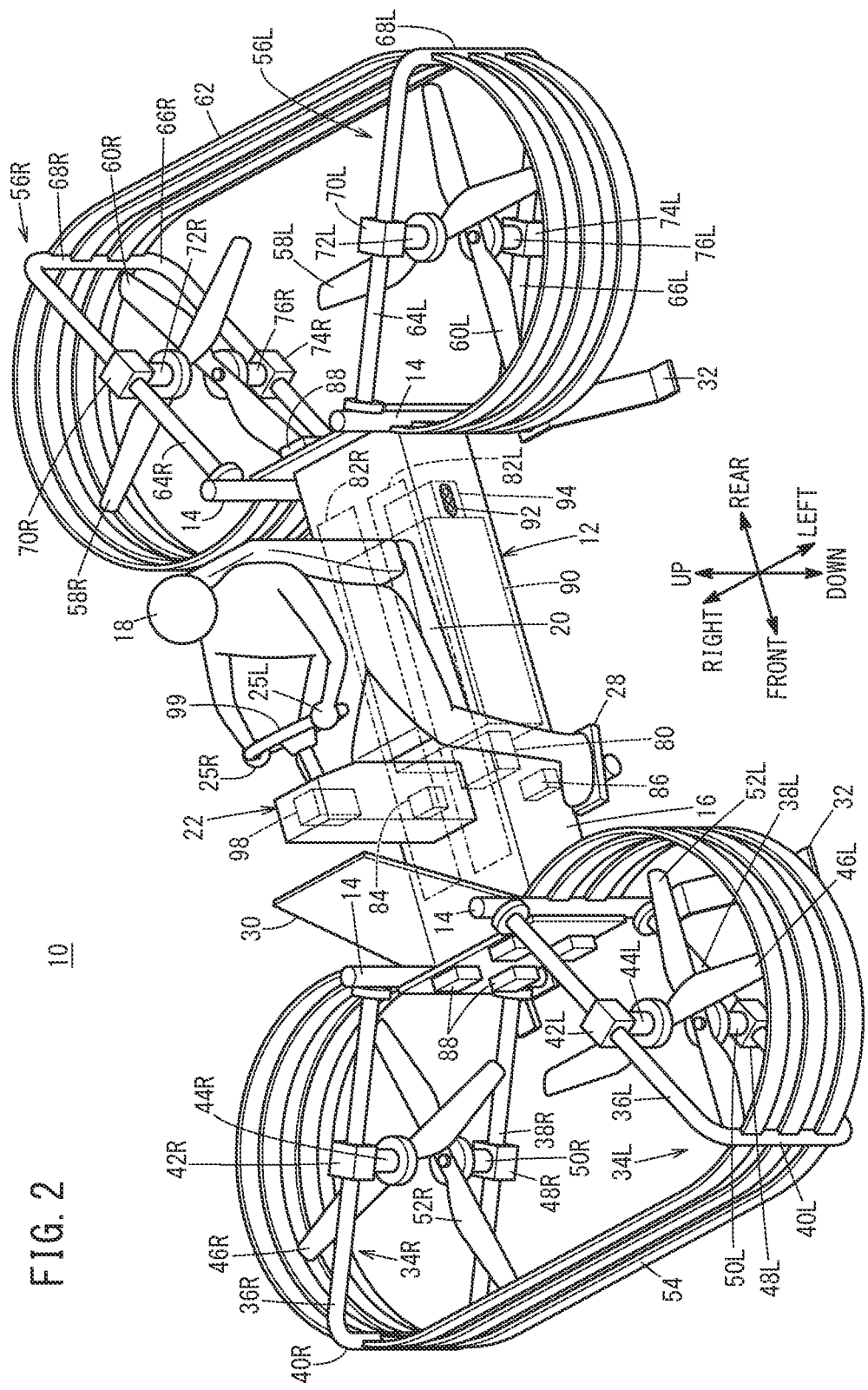
FIG. 2 is a perspective view of a modification of the aircraft of FIG. 1.

In the aircraft 10 of according to the present embodiment, the steering apparatus 22 is not limited to being the steering handlebar 24 shown in FIG. 1, and may instead have the configuration of FIG. 2, for example.

In FIG. 2, the steering apparatus 22 is formed by a steering wheel (manipulating section, steering device) 99 that simulates a steering device of a four-wheel vehicle. In this case, in a state where the rider 18 has gripped the steering wheel 99 with the left and right hands 25L and 25R, the aircraft 10 can be made to turn while becoming inclined when the steering wheel 99 is rotated around an axis in the front-rear direction. Essentially, by having the rider 18 manipulate the steering wheel 99, it is possible to control the yaw direction and the roll direction of the aircraft 10. Furthermore, the steering apparatus 22 is provided with an acceleration pedal and a breaking pedal (not shown in the drawings) that simulate the acceleration pedal and brake pedal of a four-wheel vehicle. In this case, when the rider 18 steps down on the acceleration pedal, the aircraft 10 can be made to accelerate in the advancing direction or the reversing direction according to the depression amount. Furthermore, by having the rider 18 step down on the brake pedal, it is possible to stop the aircraft 10. The manipulation amount detection sensor 98 is capable of detecting the steering angle of the steering wheel 99, the depression amount of the acceleration pedal, and the depression amount of the brake pedal.

Figure 3:
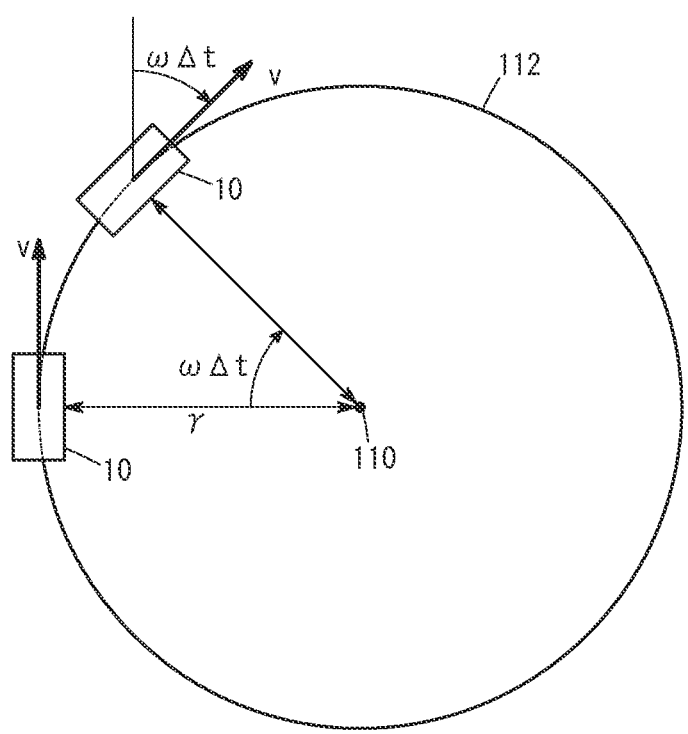
FIG. 3 is a descriptive diagram of a case in which the aircraft of FIGS. 1 and 2 is in a turning state.

FIG. 3 is a descriptive diagram of a case in which the aircraft 10 is in a turning state, as an example of a flight state of the aircraft 10. In FIG. 3, a case is shown in which the aircraft 10 is turning in a horizontal direction along a circular path 112 at a distance of a turn radius from a turning center 110, at a prescribed altitude. Here, the velocity of the aircraft 10 is v, the angular velocity is ω, and the time change amount of a time t is Δt. In FIG. 3, if the yaw rate yr of the aircraft 10 matches the angular velocity ω, as shown in Expression 1 below, it is possible for the aircraft 10 to turn and fly along the circular path 112 while an inner portion of the aircraft 10 closer to the turning center 110 faces the turning center 110.

$$yr=\omega=v/r \qquad \text{Expression 1:}$$

In this case, the turn radius r is determined by a balance between the centrifugal force, gravity, and thrust force (thrust) acting on the aircraft 10. Although not shown in the drawings, when in a hovering state, the aircraft 10 is stopped in the air at a prescribed altitude with a velocity v of 0.

Figure 4:
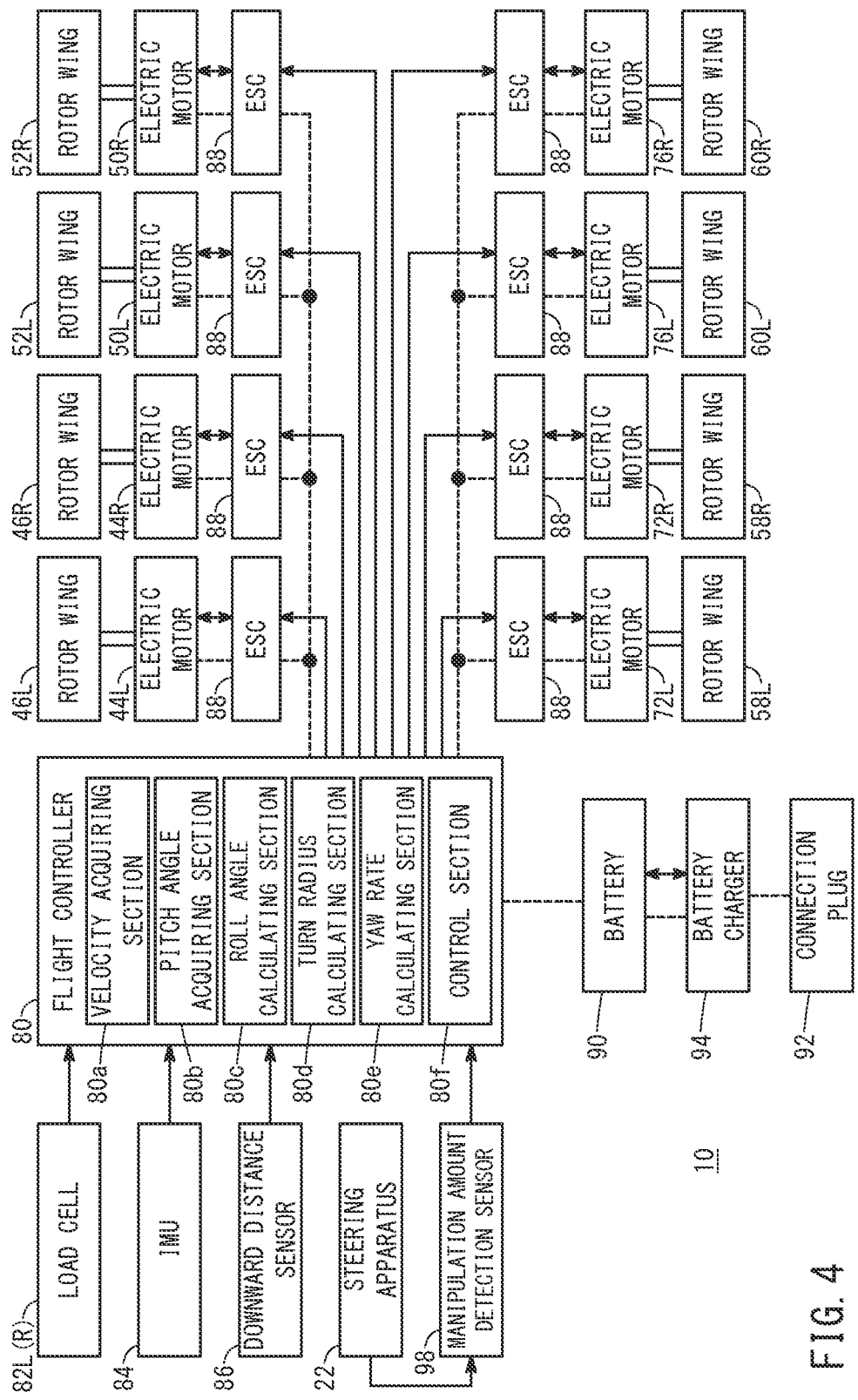
FIG. 4 is a block diagram of the aircraft of FIGS. 1 and 2.

FIG. 4 is a block diagram of the aircraft 10 according to the present embodiment. In FIG. 4, the solid lines indicate signal lines and the dashed lines indicate power lines.

The flight controller 80 realizes the functions of a velocity acquiring section 80a, a pitch angle acquiring section 80b, a roll angle calculating section 80c, a turn radius calculating section 80d, a yaw rate calculating section 80e, and a control section 80f by reading and executing a program stored in a memory (not shown in the drawings). The specific operations of these configurational elements in the flight controller 80 will be described further below.

The flight controller 80 outputs individual command signals to the ESCs 88 of the electric motors 44L, 44R, 50L, 50R, 72L, 72R, 76L, and 76R, based on each of the detection signals from the load cells 82L and 82R, the IMU 84, the downward distance sensor 86, and the manipulation amount detection sensor 98. In this case, the load cells 82L and 82R are provided on the left and right sides directly below the seat 20 (see FIGS. 1 and 2), and detect a weight movement amount of the machine including the rider 18 (center of mass movement amount and rotation amount (in the roll direction) around an axis in the front-rear direction of the aircraft 10). The IMU 84 is formed to include a gyro sensor, and detects the angular velocity and acceleration in three axial direction (posture of the machine). The downward distance sensor 86 detects the altitude of the aircraft 10 from the ground surface. As described above, the manipulation amount detection sensor 98 detects the manipulation amount of the handlebar grip 26R and the steering angle of the steering handlebar 24.

As described further below, the flight controller 80 is capable of calculating the pitch angle θ (rotational angle around an axis in the left-right direction) and the velocity of the aircraft 10, based on the detection result of the IMU 84. Therefore, with the present embodiment, instead of or in addition to the IMU 84, a GPS (Global Positioning System, Global Positioning Satellite) sensor, and infrared camera, an RGB camera, a millimeter wave radar, a LiDAR (Light Detection and Ranging, Laser Imaging Detection and Ranging), and the like are loaded in the aircraft 10, and the pitch angle θ and velocity v may be obtained based on the detection results of these detection means. In the following description, a case is described in which the IMU 84 is loaded in the aircraft 10.

By having each ESC 88 independently drive the corresponding electric motor 44L, 44R, 50L, 50R, 72L, 72R, 76L, and 76R based on the command signal, each rotor wing 46L, 46R, 52L, 52R, 58L, 58R, 60L, and 60R is rotationally driven with an individual rotational direction and rotational velocity. As a result, the aircraft 10 can be made to fly in the desired direction with the desired velocity.

[2. Operation of the Present Embodiment]

The following describes the operation of the aircraft 10 (control method of the aircraft 10) according to the present embodiment configured in the manner described above, while referencing the flow charts of FIGS. 5 to 7. In the following description, FIGS. 1 to 4 will also be referenced as necessary. The object performing the operations of the flow charts of FIGS. 5 to 7 is the flight controller 80.

Figure 5:
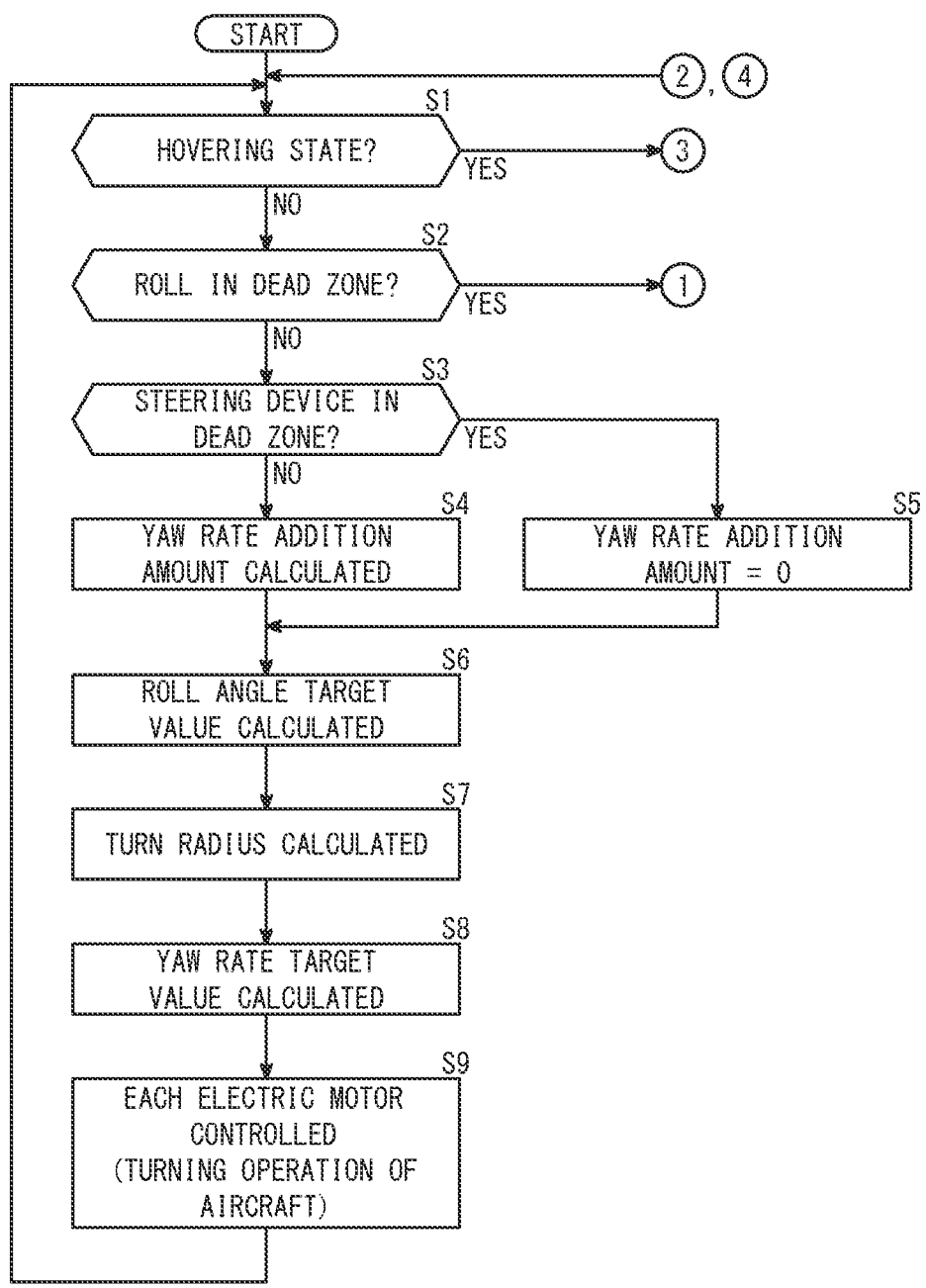
FIG. 5 is a flow chart of an operation of the aircraft of FIGS. 1 and 2.
Figure 6:
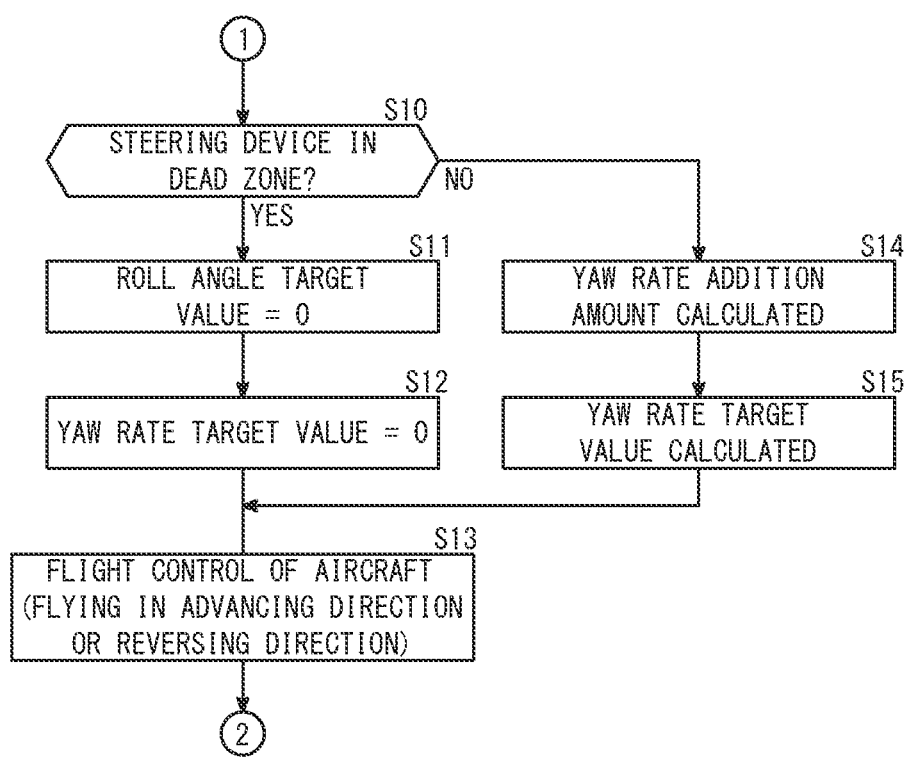
FIG. 6 is a flow chart of another operation of the aircraft of FIGS. 1 and 2.

<2.1 Operations in the Flow Chart of FIG. 5>

FIG. 5 is a flow chart for flight control of the aircraft 10 (see FIGS. 1 to 4) in a case where the aircraft 10 is not in the hovering state, e.g., where the aircraft 10 is in the turning state shown in FIG. 3.

When the aircraft 10 is flying in the air, at step S1, the velocity acquiring section 80a of the flight controller 80 calculates the velocity v of the aircraft 10 based on the detection results of the various sensors such as the IMU 84. Furthermore, the pitch angle acquiring section 80b calculates an instruction amount made by the rider 18 for the pitch angle θ of the aircraft 10 (also referred to below as the pitch manipulation amount θR), based on the manipulation amount of the handlebar grip 26R, the manipulation amount of the acceleration pedal, or the like detected by the manipulation amount detection sensor 98.

Next, the control section 80$f$ judges whether the current flight state of the aircraft 10 is the hovering state, using the velocity v and the pitch manipulation amount θR. Specifically, a judgment is made concerning whether the absolute value |v| of the velocity v is less than or equal to a velocity threshold value vth (|v|≤vth) and the absolute value |θR| of the pitch manipulation amount θR is less than or equal to a pitch manipulation amount threshold value θRth (|θR|≤θRth). If the judgment result is negative (step S1: NO), i.e., if |v|>vth or |θR|>θRth, the control section 80$f$ judges that the aircraft 10 is flying in a state other than the hovering state, and moves to the following step S2.

At step S2, the roll angle calculating section 80$c$ calculates a roll angle φ of the aircraft 10, based on the detection results of the IMU 84, the load cells 82L and 82R, and the like. Next, the control section 80$f$ judges whether the absolute value |φ| of the roll angle φ is less than a roll angle threshold value φth (|φ|<φth). The roll angle threshold value φth is an absolute value of an upper limit value or lower limit value of a prescribed range near φ=0 (dead zone in the roll direction), and if |φ|<φth, it is possible to ignore the inclination of the aircraft 10 in the roll direction. Here, if |φ|≥φth (step S2: NO), the process moves to the following step S3.

At step S3, the control section 80$f$ judges whether the absolute value |str| of a manipulation amount str of the steering handlebar 24 or the steering wheel 99 by the rider 18 is less than a steering manipulation amount threshold value strth (first manipulation amount threshold value), based on the detection result of the manipulation amount detection sensor 98. The steering manipulation amount threshold value strth refers to an absolute value of an upper limit value or a lower limit value of a prescribed range that includes the neutral position of the steering handlebar 24 or the steering wheel 99 (steering manipulation dead zone). Here, if |str|≥strth (step S3: NO), the process moves to the following step S4.

At step S4, due to the negative judgment result of step S3, the control section 80$f$ judges that the rider 18 intends to turn the aircraft 10, and instructs the yaw rate calculating section 80$e$ to calculate a yaw rate addition amount yra (yaw rate correction amount) as a correction amount for a yaw rate target value yrc. The yaw rate calculating section 80$e$ calculates the yaw rate addition amount yra based on the manipulation amount str. If the yaw rate addition amount yra is being calculated for the first time, the yaw rate target value yrc may be any value (e.g., yrc=0). Furthermore, as shown in Expression 1 above, if the aircraft 10 is in a turning state, the yaw rate yr matches the angular velocity ω (yr=yrc=ω).

On the other hand, if the judgement result of step S3 is affirmative (step S3: YES), the process moves to step S5. At step S5, since the manipulation amount str is in the dead zone, the control section 80$f$ judges that the rider 18 does not intend to turn the aircraft 10, and instructs the yaw rate calculating section 80$e$ not to calculate the yaw rate addition amount yra. Therefore, the yaw rate calculating section 80$e$ sets the yaw rate addition amount yra to 0 (yra=0).

After this, the control section 80$f$ causes the roll angle calculating section 80$c$, the turn radius calculating section 80$d$, and the yaw rate calculating section 80$e$ to perform the processes of steps S6 to S8 described below.

At step S6, the roll angle calculating section 80$c$ calculates a roll angle target value φc, based on the roll angle φ calculated at step S2.

At step S7, the turn radius calculating section 80$d$ calculates the turn radius r from Expression 2 below, using the roll angle φ (roll angle target value φc) calculated by the roll angle calculating section 80$c$, the pitch angle θ acquired by the pitch angle acquiring section 80$b$, the velocity v acquired by the velocity acquiring section 80$a$, and the like. In Expression 2, m is the mass of the aircraft 10, g is gravitational acceleration, and Faz is an air resistance value in a vertical direction.

$$r=\{(m\times v^2)/\tan\theta\}/\{(m\times g+Faz)/\cos\varphi\} \qquad \text{Expression 2:}$$

Furthermore, at step S8, the yaw rate calculating section 80$e$ calculates the yaw rate target value yrc from Expression 3 shown below, using the velocity v, the turn radius r calculated by the turn radius calculating section 80$d$, and the yaw rate addition amount yra calculated (set) by the yaw rate calculating section 80$e$ at step S4 or S5.

$$yrc=v/r+yra \qquad \text{Expression 3:}$$

After this, at step S9, the control section 80$f$ generates command signals based on the yaw rate target value yrc and the like calculated by the yaw rate calculating section 80$e$, and outputs the generated command signals to each ESC 88. Due to this, each ESC 88 individually controls one of the electric motors 44L, 44R, 50L, 50R, 72L, 72R, 76L, and 76R. As a result, the flight controller 80 can cause the aircraft 10 to perform the turning operation as shown in FIG. 3.

After this, the flight controller 80 returns to step S1. In other words, with the flight controller 80, the processes of steps S1 to S9 are repeatedly performed while the aircraft 10 is flying.

<2.2 Operations in the Flow Chart of FIG. 6>

At step S2 in FIG. 5, if the judgment result is affirmative (step S2: YES), i.e., if the roll angle φ is in the dead zone, the control section 80$f$ judges that the rider 18 does not intend to incline the aircraft 10. The processes of the flow chart of FIG. 6 are then performed in the flight controller 80.

At step S10 of FIG. 6, the control section 80$f$ (see FIG. 4) judges whether the manipulation amount str is in the dead zone, in the same manner as in step S3 of FIG. 5. If |str|<strth (step S10: YES), the control section 80$f$ judges that the manipulation amount str is in the dead zone, i.e., that the rider 18 (see FIGS. 1 and 2) does not intend to turn the aircraft 10, and causes the roll angle calculating section 80$c$ and the yaw rate calculating section 80$e$ to respectively perform the processes of the following steps S11 and S12.

That is, at step S11, the roll angle calculating section 80$c$ sets the roll angle target value φc to 0 (φc=0). At step S12, the yaw rate calculating section 80$e$ sets the yaw rate target value yrc to 0 (yrc=0).

As a result, at step S13, the flight controller 80 causes the aircraft 10 to fly in the advancing direction or the reversing direction. After this, the flight controller 80 returns to the process of step S1 in FIG. 5.

On the other hand, at step S10, if |str|≥strth (step S10: NO), the control section 80$f$ judges that the rider 18 intends to turn the aircraft 10, and causes the yaw rate calculating section 80$e$ to perform the processes of the following steps S14 and S15.

That is, at step S14, the yaw rate calculating section 80$e$ calculates the yaw rate addition amount yra, in the same manner as in step S4 of FIG. 5. At the following step S15, the yaw rate calculating section 80e calculates the yaw rate target value yrc, based on the manipulation amount str.

As a result, at step S13, the flight controller 80 causes the aircraft 10 to fly in the advancing direction or the reversing direction without inclining the aircraft 10, based on the manipulation amount str of the steering handlebar 24 or the steering wheel 99 by the rider 18. After this, the flight controller 80 returns to the process of step S1 in FIG. 5.

<2.3 Operations in the Flow Chart of FIG. 7>

At step S1 of FIG. 5, if the judgment result is affirmative (step S1: YES), i.e., if the aircraft 10 is in the hovering state, the processes in the flow chart of FIG. 7 are performed in the flight controller 80.

At step S16 of FIG. 7, the control section 80f (see FIG. 4) judges whether the absolute value lstrl of the manipulation amount str is less than the steering manipulation amount threshold value strth, in the same manner as in step S3 of FIG. 5 and step S10 of FIG. 6. If lstrl<strth (step S16: YES), the control section 80f judges that the manipulation amount str is in the dead zone and that the rider 18 (see FIGS. 1 and 2) does not intend to turn the aircraft 10, and moves to the following step S17. At step S16, the yaw rate calculating section 80e receives the affirmative judgment result of step S17, and sets the yaw rate target value yrc to 0 (yrc=0).

On the other hand, at step S16, if lstrl≥strth (step S16: NO), the control section 80f judges that the rider 18 intends to turn the aircraft 10, and moves to the following step S18. At step S18, the yaw rate calculating section 80e receives the negative judgment result of step S16, and calculates the yaw rate target value yrc based on the manipulation amount str.

At step S19, the control section 80f judges whether the absolute value |φ| of the roll angle φ is less than the roll angle threshold value φth (second manipulation amount threshold value), in the same manner as in step S2 of FIG. 5. If |φ|<φth (step S19: YES), the control section 80f judges that the roll angle φ is in the dead zone, and moves to the following step S20. At step S20, the roll angle calculating section 80c receives the affirmative judgment result of step S19, and sets the roll angle target value φc to 0 (φc=0).

As a result, at step S21, the flight controller 80 stops the aircraft 10 while maintaining the current state or stops the aircraft 10 while changing the orientation at the current flight position, without inclining the aircraft 10, based on the manipulation amount str of the steering handlebar 24 or the steering wheel 99 by the rider 18. After this, the flight controller 80 returns to step S1 of FIG. 5.

On the other hand, at step S19, if |φ|≥φth (step S19: NO), the process moves to the following step S22. At step S22, the roll angle calculating section 80c receives the negative judgment result of step S19, and calculates the roll angle target value φc based on the manipulation amount in the roll direction, such as the center of mass movement amount.

As a result, at step S21, the flight controller 80 stops the aircraft 10 while maintaining the current state or stops the aircraft 10 while changing the orientation at the current flight position, while inclining the aircraft 10, based on the manipulation amount str of the steering handlebar 24 or the steering wheel 99 by the rider 18. After this, the flight controller 80 returns to step S1 of FIG. 5.

[3. Effects of the Present Embodiment]

As described above, with the aircraft 10 and the control method thereof according to the present embodiment, the aircraft 10 includes the steering handlebar 24 or the steering wheel 99 (manipulating section) that is manipulated by the rider 18, and the control section 80f that controls the flight of the aircraft 10 in the air based on the manipulation of the steering handlebar 24 or the steering wheel 99 by the rider 18.

In this case, the aircraft 10 further includes the velocity acquiring section 80a configured to acquire the velocity v of the aircraft 10; the roll angle calculating section 80c configured to calculate the roll angle φ of the aircraft 10 based on at least the center of mass movement amount of the aircraft 10 or the manipulation amount str of the steering handlebar 24 or the steering wheel 99; the turn radius calculating section 80d configured to calculate the turn radius r of the aircraft 10 based on the velocity v and the roll angle φ; and the yaw rate calculating section 80e configured to calculate the yaw rate yr (yaw rate target value yrc) of the aircraft 10 based on the velocity v and the turn radius r.

The control section 80f is configured to control the flight of the aircraft 10 based on the roll angle φ and the yaw rate yr.

In this way, the rider 18 only needs to manipulate at least the steering handlebar 24 or the steering wheel 99, and therefore, the roll angle φ and the yaw rate yr are set automatically on the aircraft 10 side based on the manipulation amount str of the steering handlebar 24 or the steering wheel 99, and the aircraft 10 flies based on the set roll angle φ and yaw rate yr. Therefore, it is possible to fly the aircraft 10 with the same type of manipulation as used for other moving bodies, using a simple configuration.

Here, as shown in the flow chart of FIG. 5, if the aircraft 10 is not in the hovering state, the yaw rate calculating section 80e can easily calculate the yaw rate yr by using the velocity v and the turn radius r.

Furthermore, if the absolute value |φ| of the roll angle φ is greater than or equal to the roll angle threshold value φth, the yaw rate calculating section 80e calculates the yaw rate yr using the velocity v and the turn radius r. In this way, it is possible for the aircraft 10 to perform a suitable turning operation in accordance with the manipulation made by the rider 18.

In this case, the roll angle φ corresponds to the center of mass movement amount caused by the movement of the rider 18 on the aircraft 10, and if the absolute value |φ| of the roll angle φ is greater than or equal to the roll angle threshold value φth (center of mass movement amount threshold value), the yaw rate calculating section 80e calculates the yaw rate yr using the velocity v and the turn radius r. In this way, it is possible for the aircraft 10 to reliably perform the turning operation in accordance with the movement made by the rider 18.

The steering handlebar 24 or the steering wheel 99 is a steering device configured to steer the aircraft 10 in the yaw direction, and the yaw rate calculating section 80e calculates the yaw rate yr while taking into consideration the manipulation amount str. In this way, it is possible for the aircraft 10 to more reliably perform the turning operation in accordance with the manipulation made by the rider 18.

In addition, if the absolute value lstrl of the manipulation amount str is greater than or equal to the steering manipulation amount threshold value strth (first manipulation amount threshold value), the yaw rate calculating section 80e corrects the yaw rate yr, which was calculated using the velocity v and the turn radius r, using the yaw rate addition amount yra (yaw rate correction amount) that is based on the manipulation amount str. In this way, the flight control of the aircraft 10 can be suitably performed according to the manipulation of the steering handlebar 24 or the steering wheel 99 by the rider 18.

The aircraft 10 further includes the pitch angle acquiring section 80b configured to acquire the pitch angle θ of the aircraft 10. In this way, the turn radius calculating section 80d can accurately calculate the turn radius r using the velocity v, the roll angle φ, and the pitch angle θ.

In addition, as shown by the flow chart in FIG. 6, if the absolute value |φ| of the roll angle φ is less than the roll angle threshold value φth, yaw rate calculating section 80e sets the yaw rate yr while taking into consideration the manipulation amount str of the steering handlebar 24 or the steering wheel 99. In this way, it is possible to cause the aircraft 10 to suitably fly according to the manipulation made by the rider 18.

Yet further, as shown by the flow chart in FIG. 7, if the aircraft 10 is in the hovering state, the yaw rate calculating section 80e sets the yaw rate yr while taking into consideration the manipulation amount str of the steering handlebar 24 or the steering wheel 99, and the roll angle calculating section 80c sets the roll angle φ using the center of mass movement amount or the manipulation amount str if the absolute value |φ| of the roll angle φ corresponding to the center of mass movement amount is greater than or equal to the roll angle threshold value φth (second manipulation amount threshold value) or if the absolute value |str| of the manipulation amount str is greater than or equal to the steering manipulation amount threshold value strth (second manipulation amount threshold value. In this case as well, the aircraft 10 can be made to fly suitably in accordance with the manipulation made by the rider 18.

The present invention is not limited to the above-described embodiment, and it goes without saying that various configurations could be adopted therein based on the content described in the Specification.

What is claim is:

1. An aircraft comprising a manipulating section that is manipulated by a rider and a control section that controls flight in air based on manipulation of the manipulating section by the rider,
wherein the aircraft further comprises:
a velocity acquiring section configured to acquire a velocity of the aircraft;
a roll angle calculating section configured to calculate a roll angle of the aircraft, based on at least a center of mass movement amount of the aircraft or a manipulation amount of the manipulating section;
a turn radius calculating section configured to calculate a turn radius of the aircraft, based on the velocity and the roll angle; and
a yaw rate calculating section configured to calculate a yaw rate of the aircraft, based on the velocity and the turn radius, and
wherein the control section is configured to control the flight of the aircraft based on the roll angle and the yaw rate.

2. The aircraft according to claim 1, wherein if the aircraft is not in a hovering state, the yaw rate calculating section calculate the yaw rate using the velocity and the turn radius.

3. The aircraft according to claim 1, wherein if an absolute value of the roll angle is greater than or equal to a roll angle threshold value, the yaw rate calculating section calculates the yaw rate using the velocity and the turn radius.

4. The aircraft according to claim 3, wherein if an absolute value of the center of mass movement amount caused by movement of the rider on the aircraft is greater than or equal to a center of mass movement threshold value, the yaw rate calculating section calculates the yaw rate using the velocity and the turn radius.

5. The aircraft according to claim 3, wherein the manipulating section is a steering device configured to steer the aircraft in a yaw direction, and
the yaw rate calculating section calculates the yaw rate while taking into consideration a manipulation amount of the steering device.

6. The aircraft according to claim 5, wherein if an absolute value of the manipulation amount of the steering device is greater than or equal to a first manipulation amount threshold value, the yaw rate calculating section corrects the yaw rate, which was calculated using the velocity and the turn radius, using a yaw rate correction amount that is based on a manipulation amount of the steering device.

7. The aircraft according to claim 1, further comprising a pitch angle acquiring section configured to acquire a pitch angle of the aircraft,
wherein the turn radius calculating section is configured to calculate the turn radius using the velocity, the roll angle, and the pitch angle.

8. The aircraft according to claim 1, wherein the manipulating section is a steering device configured to steer the aircraft in a yaw direction, and
if an absolute value of the roll angle is less than a roll angle threshold value, the yaw rate calculating section sets the yaw rate while taking into consideration a manipulation amount of the steering device.

9. The aircraft according to claim 1, wherein the manipulating section is a steering device configured to steer the aircraft in a yaw direction,
if the aircraft is in a hovering state, the yaw rate calculating section sets the yaw rate while taking into consideration a manipulation amount of the steering device, and
if an absolute value of the center of mass movement amount or the manipulation amount of the manipulating section is greater than or equal to a second manipulation amount threshold value, the roll angle calculating section sets the roll angle using the center of mass movement amount or the manipulation amount.

10. A control method of an aircraft that includes a manipulating section that is manipulated by a rider and a control section that controls flight in air based on manipulation of the manipulating section by the rider, the control method comprising:
acquiring, with a velocity acquiring section, a velocity of the aircraft;
calculating, with a roll angle calculating section, a roll angle of the aircraft, based on at least a center of mass movement amount of the aircraft or a manipulation amount of the manipulating section;
calculating, with a turn radius calculating section, a turn radius of the aircraft, based on the velocity and the roll angle;
calculating, with a yaw rate calculating section, a yaw rate of the aircraft, based on the velocity and the turn radius; and
controlling, with the control section, the flight of the aircraft based on the roll angle and the yaw rate.

* * * * *